US012425303B2

(12) United States Patent
Massarini et al.

(10) Patent No.: US 12,425,303 B2
(45) Date of Patent: Sep. 23, 2025

(54) DISTRIBUTED AND PARTITIONED STATE MACHINE BASED RULE ENGINE FOR MESH DEVICES AND EDGE DEVICES

(71) Applicant: Red Hat, Inc., Raleigh, NC (US)

(72) Inventors: Maja Massarini, Milan (IT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 117 days.

(21) Appl. No.: 18/529,379

(22) Filed: Dec. 5, 2023

(65) Prior Publication Data

US 2025/0184223 A1    Jun. 5, 2025

(51) Int. Cl.
*H04L 41/08*      (2022.01)
*H04L 41/0823*    (2022.01)
*H04L 41/12*      (2022.01)

(52) U.S. Cl.
CPC ...... *H04L 41/0886* (2013.01); *H04L 41/0836* (2013.01); *H04L 41/12* (2013.01)

(58) Field of Classification Search
CPC .. H04L 41/0886; H04L 41/0836; H04L 41/12
See application file for complete search history.

(56) References Cited

U.S. PATENT DOCUMENTS

| | | | |
|---|---|---|---|
| 10,686,626 B2 | 6/2020 | Sarwar et al. | |
| 2014/0244554 A1* | 8/2014 | Atasu | G06F 9/4498 706/12 |
| 2018/0199218 A1* | 7/2018 | Ashrafi | H04W 24/02 |
| 2018/0351793 A1* | 12/2018 | Hunter | H04L 41/0883 |
| 2019/0149361 A1* | 5/2019 | Sarwar | H04L 41/0886 370/254 |
| 2023/0018191 A1* | 1/2023 | Moustafa | H04L 67/1095 |
| 2024/0205649 A1* | 6/2024 | Massarini | G06F 9/4498 |

FOREIGN PATENT DOCUMENTS

EP    3111322 B1    1/2021

OTHER PUBLICATIONS

"Extended European Search Report" for the application No. 24216262.6, mailed on Mar. 20, 2025. pp. 1-9.

* cited by examiner

*Primary Examiner* — Chris Parry
*Assistant Examiner* — Steven C Nguyen
(74) *Attorney, Agent, or Firm* — Womble Bond Dickinson (US) LLP

(57) ABSTRACT

A system and method of a distributed and partitioned state machine for mesh devices. The method includes obtaining a first capability dataset indicating capabilities of a first mesh node of a first mesh network system to provide a first service for a first object. The method includes obtaining a second capability dataset indicating capabilities of a second mesh node of a second mesh network system to provide a second service to a second object. The method includes generating a set of NFSM models for the first object and the second object, each NFSM model to provide the first service for the first object or the second object. The method includes providing the set of NFSM models and a partition dataset to cause a first gateway device and a second gateway device to use a single NFSM model to provide the first service to the second object.

20 Claims, 6 Drawing Sheets

400

```
┌─────────────────────────────────────────────────────────┐
│ obtaining, from a first gateway device coupled to a first mesh │
│ network system, a first capability dataset indicating capabilities │
│ of a first mesh node of the first mesh network system to provide │
│   a first service for a first object coupled to the first mesh node │
│                            402                          │
└─────────────────────────────────────────────────────────┘
                              │
                              ▼
┌─────────────────────────────────────────────────────────┐
│ obtaining, from a second gateway device coupled to a second │
│   mesh network system, a second capability dataset indicating │
│        capabilities of a second mesh node of the second mesh │
│ network system to provide a second service to a second object │
│              coupled to the second mesh node            │
│                            404                          │
└─────────────────────────────────────────────────────────┘
                              │
                              ▼
┌─────────────────────────────────────────────────────────┐
│ generating, by a processing device based on the first capability │
│     dataset and the second capability dataset, a set of non- │
│  deterministic finite-state machine (NFSM) models for the first │
│    object and the second object, each NFSM model of the set of │
│    NFSM models to provide the first service for the first object or │
│                     the second object                   │
│                            406                          │
└─────────────────────────────────────────────────────────┘
                              │
                              ▼
┌─────────────────────────────────────────────────────────┐
│   providing, to the first gateway device and the second gateway │
│        device, the set of NFSM models and a partition dataset to │
│  cause the first gateway device and the second gateway device │
│      to use a single NFSM model of the set of NFSM models to │
│           provide the first service to the second object │
│                            408                          │
└─────────────────────────────────────────────────────────┘
```

FIG. 4

DISTRIBUTED AND PARTITIONED STATE MACHINE BASED RULE ENGINE FOR MESH DEVICES AND EDGE DEVICES

TECHNICAL FIELD

The present disclosure relates generally to software technology, and more particularly, to systems and methods of a distributed and partitioned state machine based rule engine for mesh devices and edge devices.

BACKGROUND

The Internet of things (IoT) describes physical objects (or groups of such objects) with sensors, processing ability, software and other technologies that connect and exchange data with other devices and systems over the Internet or other communications networks. An edge network is a data architecture strategically organized to provision compute to the edge devices within a network. A mesh network is a network in which nodes (e.g., IoT devices, edge devices) are linked together, branching off other devices or nodes. These networks are set up to efficiently route data between devices and clients. They help individuals and organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram depicting a method of partitioning and distributing models that provide one or more services to a mesh node of a mesh network system using multiple mesh nodes of multiple mesh network systems, according to some embodiments.

DETAILED DESCRIPTION

Figure 1:
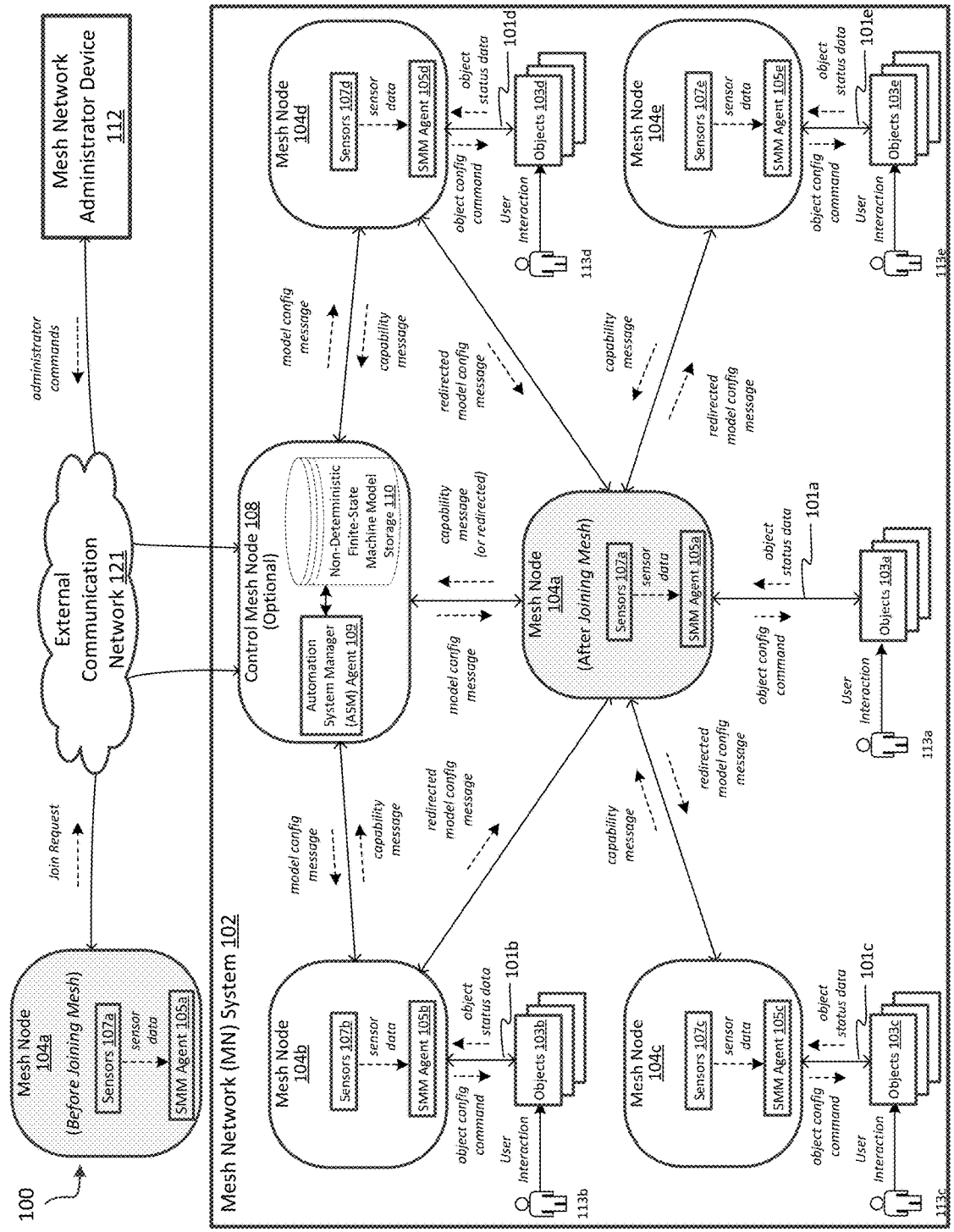
FIG. 1 is a block diagram depicting an example environment for providing additional context and decision-making capabilities in mesh network systems using IoT technology, according to some embodiments.

The present disclosure is applicable to various types of networks, such as edge networks, mesh networks, and/or IoT networks. For simplicity, however, the remainder of this disclosure will describe the various embodiments from the perspective of a mesh network.

IoT devices are used for various purposes including, for example, edge computing and automation scenarios (e.g., home, business, automotive). When a user follows the state of an automated device the user could get confused by changes that are made by the system, which uses rules that are mostly unknown to the user. The more rules there are in the system, then the more difficult it is for the user to understand what is happening. While a user can see the final state of a device, for example, when the system turns on a light, the user cannot determine why the system entered into this state where the light is turned on. The user may wonder whether some other event forced the system into this state, or if the system decided on its own to enter this state and to turn on the light. That is, the conventional automation system does not inform a user about the internal state of a device and why the device entered this internal state. Furthermore, in an automated system where both the users and the system are supposed to cooperate with one another, then an unresolvable conflict between the two is inevitable. This is a key challenge in edge deployments and automation scenarios where the user's actions and the environmental actions could cause a conflict, where the conflicts cause distractions and significant safety concerns. For example, the inability for a user to understand an internal state of the device and/or the conflicts that could arise may result in, for example, automobile accidents or a failure to promptly notify users during a building fire. Thus, there is a long felt need to solve the problem related to providing additional context and decision-making capabilities in systems using IoT technology to mitigate or prevent unsafe scenarios.

Aspects of the present disclosure address the above-noted and other deficiencies by providing additional context and decision-making capabilities in mesh network systems using IoT technology. As discussed in greater detail below, when a device joins a mesh network (e.g., an IoT network), a control mesh node (sometimes referred to as, control node) that is dedicated to controlling and/or managing the mesh nodes of a single mesh network system can generate a non-deterministic finite-state machine (NFSM) models for the device based on pre-built rules within the control mesh node that represent real-end states (e.g., ON/OFF) for the device. The non-deterministic nature of this allows for other rule types to be defined dynamically, to give more context to how the state was reached. This could include, as non-limiting examples, how the event occurred, whether it was triggered by an alarm, whether it was forced on/off by a user, and whether it was triggered by an environmental condition (e.g., temperature, pressure, moisture, etc.). By abstracting the NFSM model in this case, the embodiments of the present disclosure can take a device-agnostic view of the world. This allows the control mesh node to create generic profiles that can be used to debug in a clearer manner events of interest. It also allows the control mesh node to selectively associate devices with particular abstract models to create an interchangeable abstract representation of the NFSM model.

The control mesh node stores (e.g., in memory or a database) the NFSM model and makes it available to end users, so when a new device joins the mesh network, the control mesh node can present a plurality of NFSM models to allow the device (and/or the network's security profiles) to complimentary select an NFSM model that best suits the device or the objects it manages. This can also allow for mobility related advancements of the NFSM model, such as allowing the NFSM model to change based on the environment that the device is deployed into or that it has migrated to. For example, this could allow an NFSM model for a car while parked or when the car is in motion or when the car is at a certain location.

Benefits of the embodiments of the present disclosure include the ability to update the states of the device in real-time with new semantics, and ability to provide an explanation to the user as to why the device moved to a particular state. This provides a data service capability enriching the decision-making process by giving more context beyond the basic state the device is in, while simultaneously enriching the debugging capabilities. This in turn allows the system to provide more artificial intelligence (AI) and machine learning (ML) style techniques to optimize usage.

Furthermore, a control mesh node could be configured to control and/or manage the mesh nodes of multiple mesh network systems instead of just a single mesh network system. In this embodiment, the control mesh node generates a collection of NFSM models that represents the real-end states for each of the mesh nodes from the multiple mesh network systems. The collection of NFSM models may either be a collection of separate NFSM models (where each NFSM model is associated with a respective mesh node of one of the mesh node systems) or a single combined model which the control mesh node creates from the collection of separate NFSM models. The control mesh node obtains the topography (including routing information, mesh node identification, mesh node geographic position, and/or the like) of each mesh network system from the gateway devices that are coupled to each of the mesh network systems. The gateway devices may be the natural boundaries from a geofencing perspective wherein the protocol, responsibilities, and/or service offering may change. Each gateway device knows about and has service details (e.g., capability datasets) on the mesh nodes and applications that use it. With this knowledge, the control mesh node can create a configuration file (e.g., a partition file, a partition dataset) to architecturally partition the state machine based rules engine to complement the gateway layout. For example, the control mesh node may achieve this by parsing for service names on a per gateway basis to produce a lightweight representation of all state machine actions that pertain to that particular gateway. The control mesh node can store the configuration files in a database using any traditional protocol.

This parsing procedure produces a plurality of configuration files representing a plurality of gateway devices. The control mesh node deploys, to each gateway device coupled to the control mesh node, the base rules engine service and the configuration file to load the gateway specific state machine configuration file onto each gateway device. The gateway devices may use a publish-subscribe system (e.g., a dedicated channel) between the gateway devices to facilitate a federated-like capability across the gateway devices, which in turn, allows the disclosed system to address gateway-gateway service requests where the rule decision might span more than one gateway configuration. This also allows the disclosed system to support redundancy. For example, the control mesh node may determine that a first gateway device is making multiple network calls to second gateway device, and in response, can redeploy the rule configuration to the local gateway device, thus saving network bandwidth. Finally, this also allows the control mesh node to detect when a gateway device has suffered a failure (e.g., gone down, corrupted) through simple keep alive heartbeat like mechanisms. This could allow the control mesh node to redeploy the rules associated with the failed gateway device to another gateway device that matches the gateways parameters (e.g., same configuration and/or protocol bridge) and notify services that previously used that gateway device of their new interaction point. This can provide an additional layer of protection from the difficulties of running in an edge environment by shutting shut down services and devices that are problematic, which in turn, provides opportunities to have better resilience and recovery and overall lowers bandwidth through localization.

In an illustrative embodiment, a control mesh node obtains, from a first gateway device that is coupled to a first mesh network system, a first capability dataset indicating capabilities of a first mesh node of the first mesh network system to provide a first service for a first object coupled to the first mesh node. The control mesh node obtains, from a second gateway device that is coupled to a second mesh network system, a second capability dataset indicating capabilities of a second mesh node of the second mesh network system to provide a second service to a second object coupled to the second mesh node. The control mesh node generates, based on the first capability dataset and the second capability dataset, a partition dataset indicating that the first service is to be provided to the second object by using the first mesh node and the second mesh node. The control mesh node generates, based on the first capability dataset and the second capability dataset, a set of non-deterministic finite-state machine (NFSM) models for the first object and the second object. Each NFSM model of the set of NFSM models is configured to provide the first service for the first object or the second object. The control mesh node provides, to the first gateway device and the second gateway device, the set of NFSM models and the partition dataset to cause the first gateway device and the second gateway device to use a single NFSM model of the set of NFSM models to provide the first service to the second object.

FIG. 1 is a block diagram depicting an example environment for providing additional context and decision-making capabilities in mesh network systems using IoT technology, according to some embodiments. The environment 100 includes a mesh network system 102 (sometimes referred to as, "mesh network" or "IoT network") and a mesh network administrator device 112. The mesh network system 102 includes mesh nodes 104 (e.g., mesh nodes 104a, 104b, 104c, 104d, 104e) that are each communicatively coupled together via one or more communication networks (e.g., Bluetooth, Wi-Fi, cellular, etc.) of the mesh network system 102.

The mesh network administrator device 112 sets-up and controls the mesh network system 102 by sending commands (shown in FIG. 1 as, administrator commands) to the mesh nodes 104.

As shown in FIG. 1, mesh node 104a (sometimes referred to as, "joiner node 104a") resides outside of the mesh network system 102 prior to joining the mesh network system 102 but resides inside the mesh network system 102 after joining the mesh network system 102. Upon joining the mesh network system 102, the joiner node 104a can communicate with the other mesh node 104s of the mesh network system 102.

The mesh network system 102 includes a control mesh node 108 (sometimes referred to as, "control node"), which is a mesh node 104 that is further configured with additional administrative functionality for controlling and/or managing the other mesh nodes 104 in the mesh network system 102. It should be mentioned that the control mesh node 108 is only dedicated to controlling and/or managing the mesh nodes 104 in a single mesh network system, such as mesh network system 102. However, in other embodiments which will be described with respect to FIG. 2, the control mesh node is configured to control and/or manage the mesh nodes 104 of multiple mesh network systems.

Still referring to FIG. 1, the control mesh node 108 is communicably coupled to one or more computing devices (e.g., mesh network administrator device 112) that are outside and not a member of the mesh network system 102 via an external communication network 121. In some embodiments, the external communication network 121 may be any of the communication networks of the mesh network system 102. As discussed herein, the control mesh node 108 is configured to determine whether a mesh node 104 is permitted to join, or stay joined to, the one or more subnetworks of the mesh network system 102 based on the permissions associated with the mesh node 104*a*, and then add (or remove) the mesh node 104 to the mesh network system 102.

The control mesh node 108 includes a non-deterministic finite-state machine (NFSM) model storage 110 for storing a plurality of NFSM models for the mesh nodes 104 of the mesh network system 102. A finite-state machine (FSM) model is a mathematical model of computation. It is an abstract machine that can be in exactly one of a finite number of states at any given time. An FSM model is called a deterministic finite automaton (DFA) model if each of its transitions is uniquely determined by its source state and input symbol and reading an input symbol is required for each state transition. Conversely, a NFSM model does have to obey these restrictions.

The control mesh node 108 executes an automation system manager (ASM) agent 109 that is configured to generate a unique set of NFSM models for each mesh node 104 of the mesh network system 102 based on a capability message that the control mesh node 108 receives from each mesh node 104 and send a model configuration message (shown in FIG. 1 as, "model config message") to the mesh node 104 that includes the unique set of NFSM models. For example, the control mesh node 108 receives a first capability message from the mesh node 104*a*, a second capability message from mesh node 104*b*, a third capability message from mesh node 104*c*, a fourth capability message from mesh node 104*d*, and a fifth capability message from mesh node 104*c*.

Figure 2:
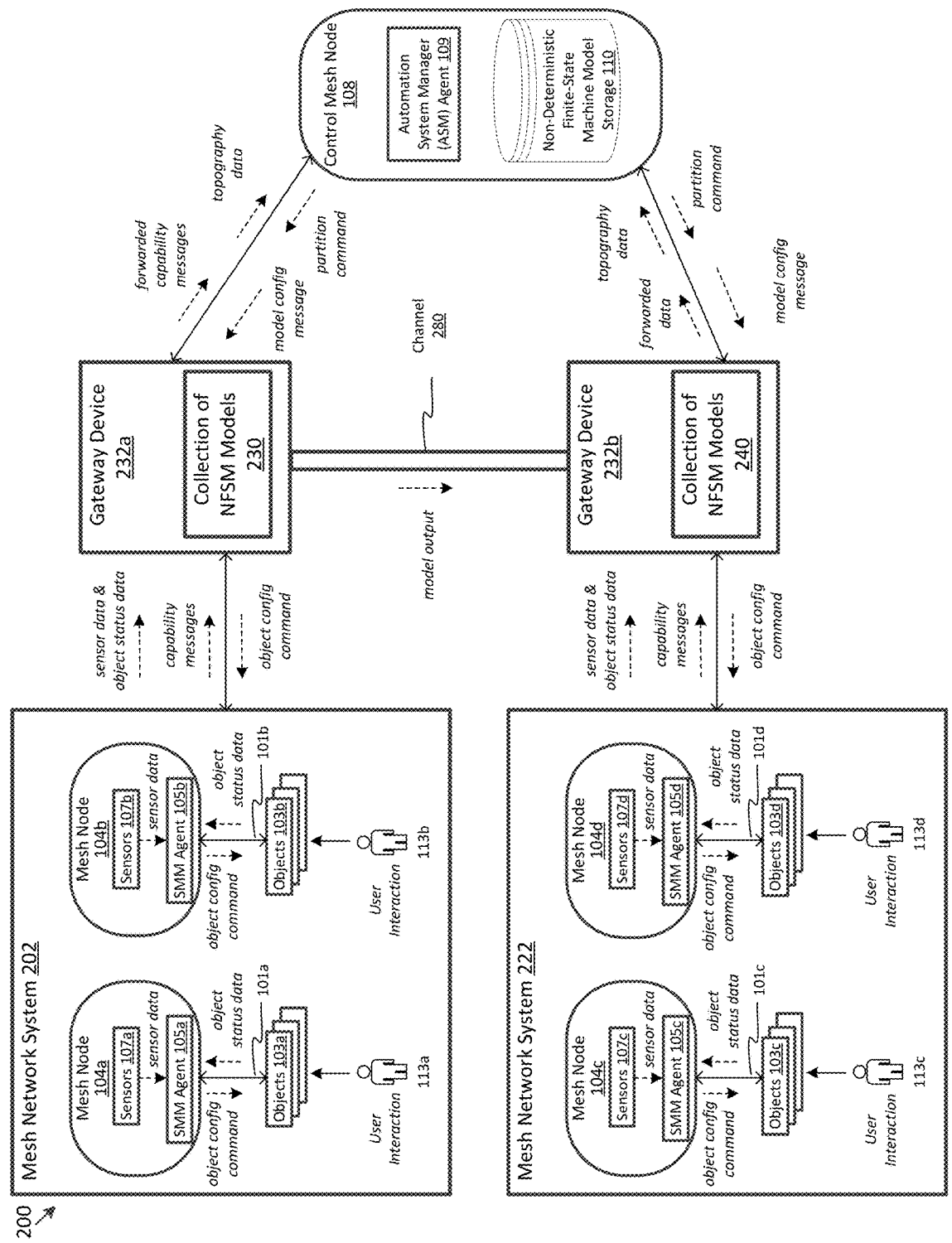
FIG. 2 is a block diagram depicting an example environment for partitioning and distributing models that provide one or more services to a mesh node of a mesh network system using multiple mesh nodes of multiple mesh network systems, according to some embodiments.

Alternatively, as discussed in greater detail with respect to FIG. 2, a control mesh node may generate a model configuration message that includes the set of NFSM models associated with each of the mesh nodes 104 (instead of only the set of NFSM models that are associated with a particular mesh node 104) and send (e.g., using individual messages or broadcasting a single message) the same model configuration message to each of the mesh nodes 104. For example, the model configuration message may include a first set of NFSM models for mesh node 104*a*, a second set of NFSM models for mesh node 104*b*, a third set of NFSM models for mesh node 104*c*, a fourth set of NFSM models for mesh node 104*d*, and a fifth set of NFSM models for mesh node 104*c*.

As another example, the control mesh node may generate the model configuration message by generating an aggregated NFSM model based on all of the capabilities from each of the mesh nodes 104. That is, the control mesh node could generate the aggregated NFSM model based on the model configuration message from mesh node 104*a*, the model configuration message from mesh node 104*b*, the model configuration message from mesh node 104*c*, the model configuration message from mesh node 104*d*, and the model configuration message from mesh node 104*c*. In this embodiment, the aggregated NFSM model would be configured to the combined performance from each set of NFSM models that are uniquely associated with each of the mesh nodes 104.

By sending all the NFSM models (or the aggregated NFSM model) to each of mesh nodes 104*a*-104*c* in the mesh network systems 102, each of the mesh nodes 104 may be able to stay informed about the current state of the models that are executing on all other mesh nodes 104 in the mesh network system 102. This allows for embodiments where multiple mesh nodes 104, each having different capabilities, can be combined to provide a new service by using their aggregated state machines. For example, mesh node 104*a* could be a look sensor and mesh node 104*b* could be a light switch. If a computing device (e.g., control mesh node, mesh node 104*a*, or mesh node 104*b*) determines that the look sensor is in a first state, then the computing device can cause the light switch to be enabled. Alternatively, if the computing device determines that the look sensor is in a second state, then the computing device can cause the light switch to be disabled. Thus, this allows the control mesh node to generate state machines based on the different capabilities of multiple mesh nodes 104.

In some embodiments, a control mesh node (which is referred to as a master control mesh node in the description with respect to FIG. 2) may generate a model configuration message that includes a first set of NFSM models associated with each of the mesh nodes 104 of a first mesh network system 102, a second set of NFSM models associated with each of the mesh nodes 104 of a second mesh network system 102, and so on. The control mesh node then sends the same model configuration message to each of the mesh nodes 104 across all the mesh network systems 102. Using this configuration, for example, a first mesh node 104 of a first mesh network system 102 could be a look sensor (e.g., light sensor, photodetector, camera) and a second mesh node 104 of a second mesh network system 102 could be a light switch. If a computing device determines that the look sensor in the first mesh network system is in a first state (e.g., an enabled state, an activated state), then the computing device can cause the light switch in the second mesh network system to be enabled. Alternatively, if the computing device determines that the look sensor in the first mesh network system is in a second state (e.g., a disabled state, a deactivated state), then the computing device can cause the light switch in a second network system to be disabled. Thus, the control mesh node was able to generate a complex system that controls multiple mesh nodes that span across multiple mesh network systems by using a combined state machine generated based on the different capabilities of the mesh nodes 104.

Still referring to FIG. 1, a capability message includes the sensor data generated by the sensor 107 of the mesh node 104. The capability message also indicates the hardware (e.g., available memory, available processing, available storage, etc.) capabilities and availabilities, software capabilities and availabilities (e.g., operating system, available services, etc.) of the mesh node 104. The capability message also includes object status data that indicates a real-time status (e.g., configuration, position, initialization) of the objects 103 that are coupled to the mesh node 104. The capability message also indicates the one or more services that the mesh node 104 is to provide to the objects 103. The capability message also includes a device type associated with the mesh node 104 and a device type associated with each of the objects 103. For example, the device type of the mesh node 104 may indicate that the mesh node is a personal computer (e.g., Raspberry Pi, laptop, desktop, etc.) and the device types of the objects may indicate that the objects are light fixtures.

The control mesh node 108 stores the NFSM models in the NFSM model storage 110. The control mesh node 108 may retrieve the NFSM models from the NFSM model storage 110 to be distributed to a mesh node 104 that is either requesting to join the mesh network system or requesting an update to its locally stored (e.g., in memory or cache) set of NFSM models.

Each mesh node 104 is communicatively coupled to one or more objects 103 via a protocol bus 101. Specifically, the mesh node 104a is communicatively coupled to one or more objects 103a via protocol bus 101a, the mesh node 104b is communicatively coupled to one or more objects 103b via protocol bus 101b, the mesh node 104c is communicatively coupled to one or more objects 103c via protocol bus 101c, the mesh node 104d is communicatively coupled to one or more objects 103d via protocol bus 101d, and the mesh node 104e is communicatively coupled to one or more objects 103e via protocol bus 101e. The protocol bus 101 may support any type of communication protocol between the mesh node 104 and its respective objects 103, such as a smart business/home protocol (e.g., Z-Wave, Zigbee, Insteon, Bluetooth, Thread), Ethernet, Wi-Fi, cellular, or the like.

A user 113 may interact with the one or more objects 103. Specifically, the user 113a may interact with the one or more objects 103a, the user 113b may interact with the one or more objects 103b, the user 113c may interact with the one or more objects 103c, the user 113d may interact with the one or more objects 103d, and the user 113e may interact with the one or more objects 103e. A user 113 may interact with the one or more objects 103 to cause the one or more objects to enter a state or be in a particular configuration. For example, a first object 103a may be a light that is coupled to a first switch and a second object 103b may be a fan that is coupled to a second switch. The user may toggle the first switch to turn on the light and toggle the second switch to turn on the fan. As another example, a first object 103a may be a curtain and a second object 103b may be blinds. The user may move the curtain to allow light to enter through a window and close the blinds to block the light from coming through the window.

Each mesh node 104 includes a plurality of sensors 107 that are each configured to detect and measure events or changes in its surrounding environment, generate data (shown in FIG. 1 as, sensor data) that is indicative of these measurements, and send the configuration data to a state machine management (SMM) agent 105 that executes on the mesh node 104. Specifically, the mesh node 104a includes sensors 107a, the mesh node 104b includes sensors 107b, the mesh node 104c includes sensors 107c, the mesh node 104d includes sensors 107d, and the mesh node 104c includes sensors 107e. A sensor may be, for example, a position sensor, a proximity sensor, a pressure sensor, a temperature sensor, a magnetic field sensor, a heart rate sensor, a light sensor, a gyroscope (e.g., to measure orientation and angular velocity of the object), an accelerometer, a force sensor, a vibration sensor, a fluid property sensor, a pressure sensor, a humidity sensor, a photo optic sensor, a photoelectric sensor, a network traffic sensor, or the like.

Each mesh node 104 executes a state machine management (SMM) 105 agent that is configured to provide one or more services to the objects 103 of the mesh node 104 by using one or more NFSM models. Specifically, the mesh node 104a executes SMM agent 105a, the mesh node 104b executes SMM agent 105b, the mesh node 104c executes SMM agent 105c, the mesh node 104d executes SMM agent 105d, and the mesh node 104a executes SMM agent 105b.

The SMM agent 105 may be configured to provide one or more services of any type. For example, the SMM agent 105a may be configured to provide an automated appliance control service for any of the objects 103a, which may be an oven, a refrigerator, a range, a washing machine, a heating venting air conditioning (HVAC) system, or the like. The SMM agent 105a may be configured to provide an automated lighting and fan service for any of the objects 103a, which may be a light, a fan, a light/fan timer, a light/fan sensor, or the like. The SMM agent 105b may be configured to provide an automated door and gate access service for any of the objects 103b, which may be a driveway gate, a pedestrian gate, a garage door, an interior or exterior door of a building, an automobile door, an automobile door/hood/trunk, or the like. The SMM agent 105c may be configured to provide an automated blind and curtain service for any of the objects 103c, which may be blinds, curtains, shades, or the like. The SMM agent 105d may be configured to provide a home or business security service for any of the objects 103d, which may be camera, a video camera, a microphone, an alarm, or the like. The SSM agent 105e may be configured to provide an entertainment service for any of the objects 103e, which may be a radio, a stereo, a speaker, a television, a computer, or the like. The SSM agent 105e may be configured to provide an automation service for any of the objects 103e, which may be critical electronics (e.g., breaking controls, steering controls, acceleration controls, exterior lighting) for an automobile and/or interior electronics (e.g., interior lighting, radio, interior HVAC, door/hood/trunk ajar lighting) for the automobile, or the like.

The SMM agent 105 may be configured to determine an object status of the one or more objects 103c coupled to the mesh node 104 of the SMM agent 105. The SMM agent 105 may use audio/video equipment (e.g., camera, microphone) associated with the mesh node 104c to detect a state (e.g., position, status, configuration) of the one or more objects 103. For example, the SMM agent 105c may be configured to provide an automated blind and curtain service for any of its objects 103c, which are curtains. The SMM agent 105c may use a video camera to determine that the curtain is either open or closed, and generate data (shown in FIG. 1 as, object status data) to indicate the current position of the curtain.

The SMM agent 105 may query the objects 103c via the protocol bus 101 to determine a position and configuration of the one or more objects 103. For example, the SMM agent 105a may be configured to provide an automated lighting service for any of the objects 103a, which may each be a light. The SMM agent 105 may query the objects 103c via the protocol bus 101 to determine that the light corresponding to a first object 103c is enabled, the light corresponding to a second object 103c is disabled, and the light corresponding to a third object 103c is burnt out. The SMM agent 105 generates object status data to indicate the current status of each of the lights.

The SMM agent 105 may include in the object status data an indication that a user 113 interacted with the one or more objects 103. For example, if the SMM agent 105a determined that an object (e.g., curtain, value, blind) was in an open or closed position, then the SMM agent 105a may determine that the object 103 is in that position because the user 113a forced the object 103 into that position. In some embodiments, the SMM agent 105 may determine that an object 103 (e.g., switch, button, lever, curtain) is in an enabled state or opened position, and in response, the SMM agent 105 may determine that the user 113 forced the object 103 to be the enabled state or opened position.

The SMM agent 105 may be configured to determine the one or more services to provide to the objects 103 based on the sensor data and/or the object status data associated with the objects 103b. To provide the service to its object 103, the SMM agent 105 selects, based on the sensor data and/or the object status data associated with the objects 103b, an NFSM model from the set of NFSM models (which are provided by the control mesh node 108) that best meets the service demands of the control mesh node 108. For example, if the sensor data indicates that it is nighttime, then the SMM agent 105 may select a first NFSM model that is configured for optimal performance in the dark. But if the sensor data indicates that it is daytime, then the SMM agent 105 may select a second NFSM model that is configured for optimal performance in daylight.

The SMM agent 105 executes the NFSM model and provides the sensor data, from its sensors 107, and/or the object status data associated with its objects 103c to the NFSM model to cause the NFSM model to generate one or more object configuration commands. The object configuration commands may instruct an object 103 to perform one or more actions or enter one or more modes/states including, for example, open/close a door/gate, enable/disable a switch (e.g., light switch, fan switch, etc.), enable/disable a mode button, open/close a curtain or blinds, or the like. The SMM agent 105 sends the one or more object configuration commands to the objects 103c to cause the one or more objects 103c perform one or more actions or enter one or more modes/states including control the objects 103c. For example, the object configuration commands may toggle a switch, trigger a button, move an object, etc.

Each mesh node (e.g., mesh node 104a, control mesh node 108, etc.) of the mesh network system 102 may be positioned (e.g., arranged, organized) within the mesh network system 102, such that the mesh node 104 is within a minimum physical distance (e.g., up to 10 meters with a Bluetooth connection, up to 46 meters with a wireless local area network (WLAN) connection) of neighboring mesh nodes to be able to communicate with its neighboring nodes by using one or more types of communication capabilities.

As shown in FIG. 1, the mesh node 104a has neighboring mesh nodes that include control mesh node 108 and mesh nodes 104b, 104c, 104d, 104e. The mesh node 104b has neighboring mesh nodes that include mesh nodes 104a and control mesh node 108. The mesh node 104c has a neighboring mesh node that includes mesh node 104a. The mesh node 104d has neighboring mesh nodes that include mesh nodes 104a and control mesh node 108. The mesh node 104e has neighboring mesh node that include mesh node 104a.

A mesh node 104 may indirectly communicate with a non-neighboring node by directly communicating through a neighboring mesh node. For example, if the control mesh node 108 wants to communicate with the mesh node 104c, then the control mesh node 108 may send a first message (e.g., model config message) to mesh node 104a to cause the mesh node 104a to send a second message (e.g., redirected model config message) to the mesh node 104c, where the second message indicates the details of the first message. As another example, the control mesh node 108 may send a first message (e.g., model config message) to the mesh node 104b to cause the mesh node 104b to send a second message (e.g., redirected model config message) to the mesh node 104a to cause the mesh node 104 to send a third message (e.g., redirected model config message) to the mesh node 104c, where the third message indicates the details of the first message and the second message. As another example, the mech node 104c may send a capability message to the mesh node 104a to cause the mesh node 104a to send the capability message (shown in FIG. 1 as, "redirected capability message") to the control mesh node 108.

A mesh node 104 may be configured to discover its neighboring mesh nodes by broadcasting a ping message outward and identifying the mesh nodes that responds to the ping message as its neighboring mesh nodes. For example, the mesh node 104a may transmit ping messages toward the mesh nodes 104b, 104c, 104d, 104e and control mesh node 108 to cause each of the nodes to either respond with an acknowledgement (e.g., an ACK) or not respond (e.g., stay silent). A mesh node 104 may send a message to the control mesh node 108 to indicate its discovery of its neighboring nodes.

A communication network (e.g., external communication network 121, any of the communication networks of the mesh network system 102) may be a public network (e.g., the internet), a private network (e.g., a local area network (LAN) or wide area network (WAN)), or a combination thereof. In some embodiments, a communication network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g., cell towers), etc. The external network may carry communications (e.g., data, message, packets, frames, etc.) between any other the computing device.

A mesh node 104, the control mesh node 108, and a mesh network administrator device 112 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

In some embodiments, the mesh node 104, the control mesh node 108, and the mesh network administrator device 112 may each be a wearable device (e.g., smartwatch, smart clothing, smart glasses, smart jewelry, wearable camera, wireless earbuds, fitness tracker, blood pressure monitor, heart rate monitor, etc.) or an implantable device (e.g., insulin pump, cochlear device, pacemaker, brain simulator, etc.).

Still referring to FIG. 1, the control mesh node 108 of the mesh network system 102 receives a join request from the mesh node 104a (sometimes referred to as, "joiner node") to join the mesh network system 102. The mesh node 104a is configured to provide a service (e.g., home automation account, security service, etc.) to one or more objects 103a (e.g., lights, cameras, curtains, etc.) that are communicatively coupled to the mesh node 104a. The control mesh node 108 is configured to generate a set of non-deterministic finite-state machine (NFSM) models based on the service. Each NFSM model is configured to provide a unique version of the service by determining a state (e.g., enabled/disabled, open/closed, etc.) of the one or more objects 103 based on sensor data (e.g., light data, acoustic data, etc.) received from sensors 107*a* and object status data that is indicative of a user interaction (from user 109*a*) with the one or more objects 103*a*, and generating a model output that is indicative of that state. The control mesh node 108 is configured to provide the set of NFSM models to the mesh node 104*a* to cause the mesh node 104*a* to select a single NFSM model of the set of NFSM models and use the single NFSM model to provide the unique version of the service to the one or more objects 103.

Although FIG. 1 shows only a select number of computing devices (e.g., mesh nodes 104, control mesh node 108, and mesh network administrator device 112), the environment 100 may include any number of computing devices that are interconnected in any arrangement to facilitate the exchange of data between the computing devices.

FIG. 2 is a block diagram depicting an example environment for partitioning and distributing models that provide one or more services to a mesh node of a mesh network system using multiple mesh nodes of multiple mesh network systems, according to some embodiments. The environment 200 includes a mesh network system 202, a mesh network system 222, a control mesh node 108, and gateway devices 232 (e.g., gateway device 232*a*, gateway device 232*b*), that are each communicatively coupled together via the external communication network 121 in FIG. 1. The mesh network systems 202, 222 may each be a mesh network system, such as the mesh network system 102. The mesh network system 202 includes mesh nodes 104 (e.g., mesh nodes 104*a* and 104*b*) that are each communicatively coupled together via one or more communication networks of the mesh network system 202. The mesh network system 222 includes mesh nodes 104 (e.g., mesh nodes 104*c* and 104*d*) that are each communicatively coupled together via one or more communication networks of the mesh network system 222. In some embodiments, the mesh network system 202 corresponds to a first geofence and the mesh network system 222 corresponds to a second geofence.

The gateway device 232 is also coupled to the gateway device 232*b* via a channel 280, which is configured to allow the gateway devices 232 to communicate with one another. For example, the gateway device 232*a* may send data (e.g., a model output) to the gateway device 232*b* via the channel 280.

To support the embodiments that partition the models, the SMM agent 105 on each of the mesh nodes are further configured to provide the sensor data, from its sensors 107, and/or the object status data associated with its objects 103*c* to their respective gateway device 232. Specifically, the mesh node 104*a* sends its sensor data and the object status data that is associated with objects 103*a* to gateway device 232 and the mesh node 104*b* sends its sensor data and the object status data that is associated with objects 103*b* to gateway device 232*a*. The gateway device 232*a* forwards (shown in FIG. 2 as forwarded capability messages) the capability messages to the control mesh node 108. Likewise, the mesh node 104*c* sends its sensor data and the object status data that is associated with objects 103*c* to gateway device 232*b* and the mesh node 104*d* sends its sensor data and the object status data that is associated with objects 103*d* to gateway device 232*b*. The gateway device 232*b* forwards the capability messages to the control mesh node 108.

The control mesh node 108 uses its ASM agent 109 to generate a unique set of NFSM models for each mesh node 104 of the mesh network system 102 based on the capability message that the control mesh node 108 receives from each mesh node 104. For example, the control mesh node 108 generates a set of NFSM models for the mesh node 104*a* based on the capability message associated with the mesh node 104, where a first NFSM model of the set of NFSM models may be optimized for low-light conditions, a second NFSM model of the set of NFSM models may be optimized for normal-light conditions, and a third NFSM model of the set of NFSM models may be optimized for high-light conditions.

The control mesh node 108 may generate a model configuration message that includes the different sets of NFSM models that are associated with the mesh nodes 104 of the mesh network system 202 to the gateway devices 232*a*. For example, the control mesh node 108 sends (via one or more model configuration messages) a collection of NFSM models to the gateway device 232*a*, where the collection of models includes a first set of NFSM models associated with the mesh node 104*a* and a second set of NFSM models associated with the mesh node 104*b*. Likewise, the control mesh node 108 sends (via one or more model configuration messages) a collection of NFSM models to the gateway device 232*b*, where the collection of models includes a first set of NFSM models associated with the mesh node 104*c* and a second set of NFSM models associated with the mesh node 104*d*.

In some embodiments, the control mesh node 108 may use its ASM agent 109 to generate a unique set of NFSM models for a particular mesh node 104 based on not only the capability message of the particular mesh node 104, but also based on the capability messages other mesh nodes 104 of the same mesh node system. For example, the control mesh node 108 may use its ASM agent 109 to generate a unique set of NFSM models for mesh node 104*a* based on the capability messages associated with mesh nodes 104*a* and the capability message associated with mesh node 104*b*. Likewise, the control mesh node 108 may use its ASM agent 109 to generate a unique set of NFSM models for mesh node 104*c* based on the capability messages associated with mesh nodes 104*c* and the capability message associated with mesh node 104*d*.

In some embodiments, the control mesh node 108 may use its ASM agent 109 to generate a unique set of NFSM models for a particular mesh node 104 based on not only the capability message of the particular mesh node 104, but also based on the capability messages other mesh nodes 104 of multiple mesh node systems. For example, the control mesh node 108 may use its ASM agent 109 to generate a unique set of NFSM models for mesh node 104*a* based on the capability messages associated with mesh nodes 104*a*, the capability message associated with mesh node 104*b*, the capability message associated with mesh node 104*c*, and capability message associated with mesh node 104*d*. Likewise, the control mesh node 108 may use its ASM agent 109 to generate a unique set of NFSM models for mesh node 104*c* based on the capability messages associated with mesh nodes 104*c*, the capability message associated with mesh node 104*d*, the capability message associated with mesh node 104*a*, and capability message associated with mesh node 104*b*.

The control mesh node 108 may, in some embodiments, generate a single model based on multiple NFSM models. Thus, the collection of NFSM models 230 may either be a group of individual NFSM models or a single NFSM model that includes the group of individual NFSM models. Likewise, the collection of NFSM models 240 may either be a group of individual NFSM models or a single NFSM model that includes the group of individual NFSM models.

As shown in FIG. 1, the control mesh node 108 may send the same collection of NFSM models 230 to the gateway device 232a and the gateway device 232b. For example, the control mesh node 108 sends a collection of NFSM models 230 to the gateway device 232a to cause the gateway device 232a to execute its received copy of the collection of NFSM models (shown in FIG. 2 as collection of NFSM models 230). The control mesh node 108 also sends the same collection of NFSM models 230 to the gateway device 232b to cause the gateway device 232b to execute its received copy of the collection of NFSM models (shown in FIG. 2 as collection of NFSM models 240). That is, in this embodiment, the collection of NFSM models 230 is identical to the collection of NFSM models 240.

Alternatively, the control mesh node 108 may send a collection of NFSM models 230 to the gateway device 232a and a collection of NFSM models 240 to the gateway device 232b, where the collection of NFSM models 230 is different from the collection of NFSM models 240.

Still referring to FIG. 2, the control mesh node 108 may obtain, from the gateway device 232a via a capability message, a first capability dataset indicating capabilities of the mesh node 104a of the mesh network system 202 to provide a first service for the object 103a that is coupled to the mesh node 104a. The control mesh node 108 may obtain, from the gateway device 232b via a capability message, a second capability dataset indicating capabilities of the mesh node 104c of the mesh network system 222 to provide a second service to the object 103c that is coupled to the mesh node 104c. The control mesh node 108 may generate, based on the first capability dataset and the second capability dataset, a partition dataset indicating that the first service is to be provided to the object 103c by using the mesh node 104a and the mesh node 104c. The control mesh node 108 may generate, based on the first capability dataset and the second capability dataset, a set of NFSM models for the object 103a and the object 103c. Each NFSM model of the set of NFSM models is configured to provide a unique version of the first service for the object 103a or the object 103c. The control mesh node 108 may provide, to the gateway device 232a and the gateway device 232b, the set of NFSM models and the partition dataset to cause the gateway device 232a and the gateway device 232b to use a single NFSM model of the set of NFSM models to provide the unique version of the first service to the object 103c. That is, the gateway device 232a selects, based on the sensor data and/or the object status data associated with the objects 103a, an NFSM model from the set of NFSM that best meets the service demands, uses the selected model to generate object a configuration command, and sends the object configuration command to the mesh node 104a. Likewise, the gateway device 232b selects, based on the sensor data and/or the object status data associated with the objects 103c, an NFSM model from the set of NFSM that best meets the service demands, uses the selected model to generate object a configuration command, and sends the object configuration command to the mesh node 104c.

Figure 3B:
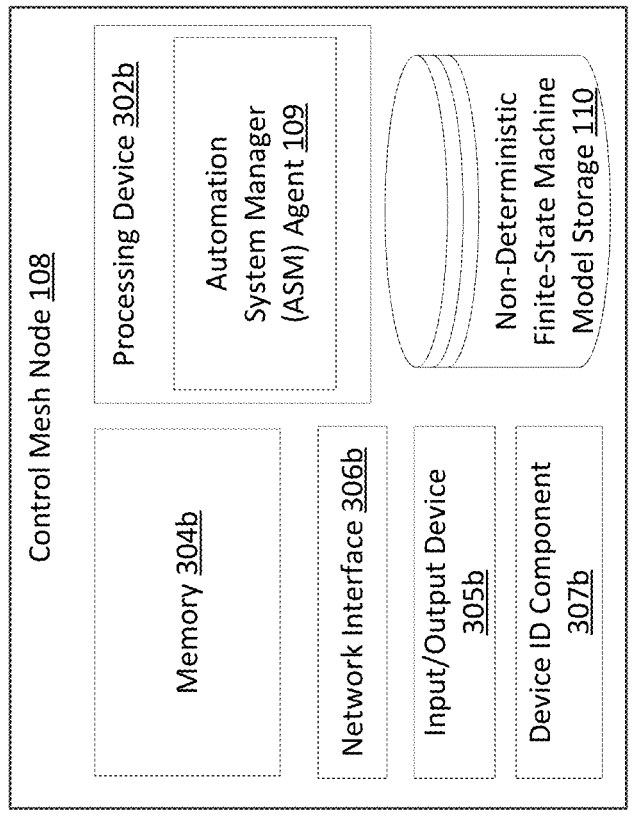
FIG. 3B is a block diagram depicting an example control mesh node of the environments in FIGS. 1 and 2, according to some embodiments.
Figure 3A:
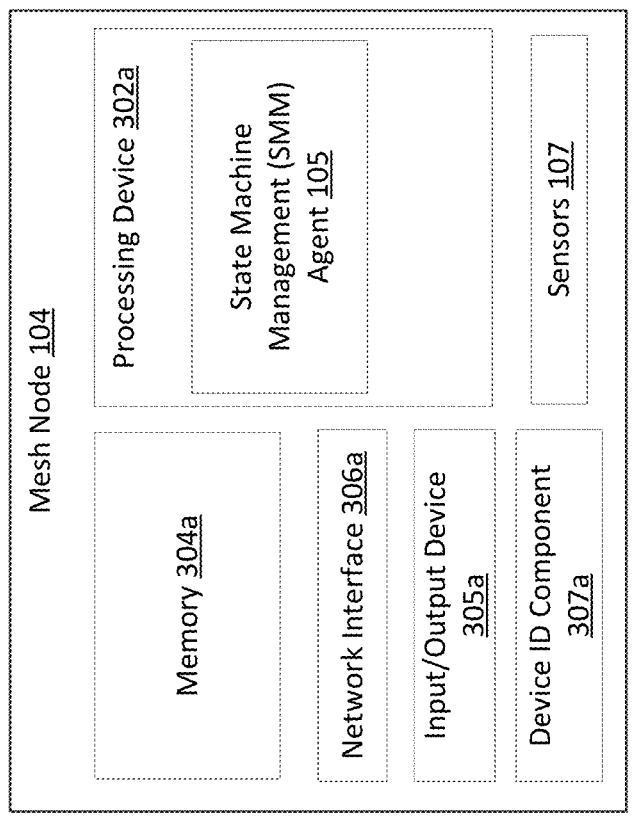
FIG. 3A is a block diagram depicting an example mesh node of the mesh network systems in FIGS. 1 and 2, according to some embodiments.

FIG. 3A is a block diagram depicting an example mesh node of the mesh network systems in FIGS. 1 and 2, according to some embodiments. While various devices, interfaces, and logic with particular functionality are shown, it should be understood that the one or more mesh nodes 104 (e.g., mesh nodes 104a-e) of the mesh network system 102 each include any number of devices and/or components, interfaces, and logic for facilitating the functions described herein. For example, the activities of multiple devices may be combined as a single device and implemented on a same processing device (e.g., processing device 302a), as additional devices and/or components with additional functionality are included.

The mesh node 104 includes a processing device 302a (e.g., general purpose processor, a PLD, etc.), which may be composed of one or more processors, and a memory 304a (e.g., synchronous dynamic random-access memory (DRAM), read-only memory (ROM)), which may communicate with each other via a bus (not shown).

The processing device 302a may be provided by one or more general-purpose processing devices such as a microprocessor, central processing unit, or the like. In some embodiments, processing device 302a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 302a may include one or more special-purpose processing devices such as an application specific integrated circuit (ASIC), a field programmable gate array (FPGA), a digital signal processor (DSP), network processor, or the like. The processing device 302a may be configured to execute the operations described herein, in accordance with one or more aspects of the present disclosure, for performing the operations and steps discussed herein.

The memory 304a (e.g., Random Access Memory (RAM), Read-Only Memory (ROM), Non-volatile RAM (NVRAM), Flash Memory, hard disk storage, optical media, etc.) of processing device 302a stores data and/or computer instructions/code for facilitating at least some of the various processes described herein. The memory 304a includes tangible, non-transient volatile memory, or non-volatile memory. The memory 304a stores programming logic (e.g., instructions/code) that, when executed by the processing device 302a, controls the operations of the mesh node 104. In some embodiments, the processing device 302a and the memory 304a form various processing devices and/or circuits described with respect to the mesh node 104. The instructions include code from any suitable computer programming language such as, but not limited to, C, C++, C#, Java, JavaScript, VBScript, Perl, HTML, XML, Python, TCL, and Basic.

The processing device 302a may execute a state machine management (SMM) agent 105 that is configured to send a request to the control mesh node 108 to join the mesh network system 102. The SMM agent 105 may be configured to provide a service to one or more objects 103.

The SMM agent 105 may be configured to receive a set of NFSM models, where each NFSM model is configured to provide a unique version of the service by determining a state of the one or more objects 103 based on sensor data and object status data indicative of a user interaction with the one or more objects 103. Each NFSM model generates a model output that is indicative of the determined state.

The SMM agent 105 may be configured to select a single NFSM model of the set of NFSM models and use the single NFSM model to provide the unique version of the service to the one or more objects 103. The SMM agent 105 may be configured to use the single NFSM to determine the state of the one or more objects 103 by determining, based on the object status data, that a user 113 forced the one or more objects 103 into the state.

The SMM agent 105 may be configured to use the single NFSM to determine the state of the one or more objects 103 by identifying a second state for the one or more objects 103 based on the sensor data and allow the one or more objects 103 to be in the state responsive to identifying the second state for the one or more objects 103.

The SMM agent 105 may be configured to determine the state of the one or more objects 103 by determining that the one or more objects 103 are configured in an intermediate state, identify the state of the one or more objects 103 based on the sensor data, reconfigure the one or more objects 103 from the intermediate state into the state.

In some embodiments, the user 113 caused the one or more objects 103 to enter the state by at least one of moving the one or more objects 103, toggling a switch associated with the one or more objects 103, or pushing a button associated with the one or more objects 103.

The SMM agent 105 may be configured to gather the sensor data from one or more sensors 107 coupled to the mesh node 104, where the sensor data is indicative of an environment associated with the mesh node 104.

The SMM agent 105 may be configured to determine the state of the one or more objects 103 by determining that the single NFSM model generates an undesired (e.g., non-optimal for the object 103) output based on at least one of the sensor data or the object status data, and in response, select a second NFSM model of the set of NFSM models and use the second NFSM model to provide a second unique version of the service to the one or more objects 103.

The SMM agent 105 may be configured to determine the state of the one or more objects 103 by generating a description associated with the one or more objects 103, and presenting (e.g., on a screen) the description to the user 113.

In some embodiments, the description includes at least one or more of an indication that the user forced the one or more objects 103 into the state, an indication that one or more alarms caused one or more objects 103 to enter the state, or an indication that one or more sensors caused the one or more objects 103 to enter the state.

The SMM agent 105 may be configured to determine the state of the one or more objects 103 by determining a conflict between a first state selected by the user and a second state selected by the single NFSM model, selecting, based on the service, the second state selected by the single NFSM model instead of the first state selected by the user 113; and configuring (e.g., via an object configuration command) the one or more objects 103 into the second state.

The mesh node 104 includes a one or more sensors 107 that are each configured to detect and measure events or changes in its surrounding environment, generate data (shown in FIG. 1 as, sensor data) that is indicative of these measurements, and send the configuration data to its respective SMM agent 105.

The mesh node 104 includes a network interface 306a configured to establish a communication session with a computing device for sending and receiving data over a communication network to the computing device. Accordingly, the network interface 306a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the mesh node 104 includes a plurality of network interfaces 306a of different types, allowing for connections to a variety of networks, such as local area networks (public or private) or wide area networks including the Internet, via different sub-networks.

The mesh node 104 includes an input/output device 305a configured to receive user input from and provide information to a user. In this regard, the input/output device 305a is structured to exchange data, communications, instructions, etc. with an input/output component of the mesh node 104. Accordingly, input/output device 305a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the mesh node 104, such as a built-in display, touch screen, microphone, etc., or external to the housing of the mesh node 104, such as a monitor connected to the mesh node 104, a speaker connected to the mesh node 104, etc., according to various embodiments. In some embodiments, the mesh node 104 includes communication circuitry for facilitating the exchange of data, values, messages, and the like between the input/output device 305a and the components of the mesh node 104. In some embodiments, the input/output device 305a includes machine-readable media for facilitating the exchange of information between the input/output device 305a and the components of the mesh node 104. In still another embodiment, the input/output device 305a includes any combination of hardware components (e.g., a touchscreen), communication circuitry, and machine-readable media.

The mesh node 104 includes a device identification component 307a (shown in FIG. 3A as device ID component 307a) configured to generate and/or manage a device identifier (sometimes referred to as, "mesh node ID") associated with the mesh node 104. The device identifier may include any type and form of identification used to distinguish the mesh node 104 from other computing devices. In some embodiments, to preserve privacy, the device identifier may be cryptographically generated, encrypted, or otherwise obfuscated by any device and/or component of mesh node 104. In some embodiments, the mesh node 104 may include the device identifier in any communication (e.g., public encrypted message, private encrypted message, etc.) that the mesh node 104 sends to a computing device.

The mesh node 104 includes a bus (not shown), such as an address/data bus or other communication mechanism for communicating information, which interconnects the devices and/or components of mesh node 104, such as processing device 302a, network interface 306a, input/output device 305a, and/or device ID component 307a.

In some embodiments, some or all the devices and/or components of mesh node 104 may be implemented with the processing device 302a. For example, the mesh node 104 may be implemented as a software application stored within the memory 304a and executed by the processing device 302a. Accordingly, such embodiment can be implemented with minimal or no additional hardware costs. In some embodiments, any of these above-recited devices and/or components rely on dedicated hardware specifically configured for performing operations of the devices and/or components.

FIG. 3B is a block diagram depicting an example control mesh node of the environments in FIGS. 1 and 2, according to some embodiments. While various devices, interfaces, and logic with particular functionality are shown, it should be understood that the control mesh node 108 includes any number of devices and/or components, interfaces, and logic for facilitating the functions described herein. For example, the activities of multiple devices may be combined as a single device and implemented on a same processing device (e.g., processing device 302b), as additional devices and/or components with additional functionality are included.

The control mesh node 108 includes a processing device 302b (e.g., general purpose processor, a PLD, etc.), which may be composed of one or more processors, and a memory 304b (e.g., synchronous dynamic random-access memory (DRAM), read-only memory (ROM)), which may communicate with each other via a bus (not shown). The processing device 302b includes identical or nearly identical functionality as processing device 302a in FIG. 3a, but with respect to devices and/or components of the control mesh node 108 instead of devices and/or components of the mesh node 104.

The memory 304b of processing device 302b stores data and/or computer instructions/code for facilitating at least some of the various processes described herein. The memory 304b includes identical or nearly identical functionality as memory 304a in FIG. 3A, but with respect to devices and/or components of the control mesh node 108 instead of devices and/or components of the mesh node 104.

The processing device 302b may execute an automation system manager (ASM) agent 109 that is configured to receive a request from a mesh node 104 to join the mesh network system 102. The ASM agent 109 may be configured to generate a set of non-deterministic finite-state machine (NFSM) models based on a service that is to be provided by the mesh node 104 to one or more objects 103 that are coupled to the mesh node 104. The ASM agent 109 configures each NFSM model such that they provide a unique version of the service by determining a state of the one or more objects 103 based on sensor data and object status data indicative of a user interaction with the one or more objects 103. The ASM agent 109 may be configured to provide the set of NFSM models to the mesh node 104 to cause the mesh node 104 to select a single NFSM model of the set of NFSM models and use the single NFSM model to provide the unique version of the service to the one or more objects 103.

The ASM agent 109 may be configured obtain, from the gateway device 232 that is coupled to the mesh network system 202, a first capability dataset indicating capabilities of the mesh node 104a of the mesh network system 202 to provide a first service for an object 103a coupled to the mesh node 104a. The ASM agent 109 may be configured obtain, from the gateway device 232b that is coupled to the mesh network system 222, a second capability dataset indicating capabilities of the mesh node 104c of the mesh network system 222 to provide a second service to an object 103c that is coupled to the mesh node 104. The ASM agent 109 may be configured to generate, based on the first capability dataset and the second capability dataset, a partition dataset indicating that the first service is to be provided to the object 103c by using the mesh node 104a and the mesh node 104c. The ASM agent 109 may be configured to generate, based on the first capability dataset and the second capability dataset, a set of NFSM models for the object 103a and the object 103c. Each NFSM model of the set of NFSM models is configured to provide a unique version of the first service for the object 103a or the object 103c. The ASM agent 109 may be configured to provide, to the gateway device 232a and the gateway device 232b, the set of NFSM models and the partition dataset to cause the gateway device 232a and the gateway device 232b to use a single NFSM model of the set of NFSM models to provide the unique version of the first service to the object 103c.

The ASM agent 109 may be configured to discover the gateway device 232a and the gateway device 232b. The ASM agent 109 may be configured to obtain, from the gateway device 232a, a first topography dataset identifying a first group of mesh nodes (e.g., mesh nodes 104a, 104b) of the mesh network system 202. The ASM agent 109 may be configured to obtain, from the gateway device 232b, a second topography dataset identifying a second group of mesh nodes (e.g., mesh nodes 104c, 104d) of the mesh network system 222. The ASM agent 109 may be configured to query, using the first topography dataset, the gateway device 232a for the first topography dataset. The ASM agent 109 may be configured to query, using the second topography dataset, the gateway device 232b for the second topography dataset.

In some embodiments, providing the set of NFSM models and the partition dataset to the gateway device 232a further causes the gateway device 232a to determine a state of the object 103a based on the single NFSM model and sensor data associated with the mesh node 104a, and/or provide a model output indicative of the state of the object 103a to the gateway device 232b. In some embodiments, the gateway device 232a provides the model output to the gateway device 232b via the channel 280 between the gateway device 232a and the gateway device 232b. In some embodiments, providing the set of NFSM models and the partition dataset to the gateway device 232b device further causes the gateway device 232b to enter a listen mode to listen for the model output from the gateway device 232a. In some embodiments, providing the set of NFSM models and the partition dataset to the gateway device 232b further causes the gateway device 232b to generate configuration data for the object 103c based on the single NFSM model and the model output. In some embodiments, providing the set of NFSM models and the partition dataset to the gateway device 232b further causes the gateway device 232b to provide the configuration data to the mesh node 104c.

The ASM agent 109 may generate, based on the first capability dataset and the second capability dataset, the partition dataset by determining a first capability of the mesh node 104a to provide a first portion (e.g., detecting an amount of ambient light) of the first service and a second capability of the mesh node 104c to provide a second portion (e.g., controlling a switch) of the first service.

The ASM agent 109 may detect a failure associated with the gateway device 232b. The ASM agent 109 may instruct, responsive to detecting the failure, the gateway device 232a to provide a model output from a selected NFSM model of the set of NFSM models to a third gateway device (e.g., a gateway device that is different from the gateway devices 232a, 232b) that is coupled to a third mesh network system (e.g., a mesh network system that is different from the mesh network systems 202, 222). In some embodiments, the model output is indicative of a state of the object 103a coupled to the mesh node 104a.

The ASM agent 109 may instruct the gateway device 232a to provide the model output from the selected NFSM model of the set of NFSM models to the third gateway device by obtaining, from the third gateway device, a third capability dataset indicating capabilities of a third mesh node of the third mesh network system to provide a third service for a third object that is coupled to the third mesh node. The ASM agent 109 may generate, based on the first capability dataset and the third capability dataset, a different partition dataset indicating that the first service is to be provided to the third object by using the mesh node 104a and the third mesh node. The ASM agent 109 may generate, based on the first capability dataset and the third capability dataset, a different set of NFSM models for the object 103a and the third object, where each NFSM model of the different set of NFSM models is configured to provide the unique version of the first service for the object 104a or the third object. The ASM agent 109 may provide, to the gateway device 232a and the third gateway device, the different set of NFSM models and the different partition dataset to cause the gateway device 232a and the third gateway device to use a different NFSM model of the different set of NFSM models to provide the unique version of the first service to the third object.

In some embodiments, providing, to the gateway device 232a and the gateway device 232b, the set of NFSM models and the partition dataset further causes the gateway device 232a to receive a first copy of the set of NFSM models and execute a first NFSM model of the first copy of the set of NFSM models on a processing device of the gateway device 232a, and/or the gateway device 232b to receive a second copy of the set of NFSM models and execute a second NFSM model of the second copy of the set of NFSM models on a processing device of the gateway device 232b, where the first NFSM model corresponds to the second NFSM model.

The control mesh node 108 includes a non-deterministic finite-state machine (NFSM) model storage 110 for storing a plurality of NFSM models for the mesh nodes 104 of the mesh network system 102. A finite-state machine (FSM) model is a mathematical model of computation. It is an abstract machine that can be in exactly one of a finite number of states at any given time. An FSM model is called a deterministic finite automaton (DFA) model if each of its transitions is uniquely determined by its source state and input symbol and reading an input symbol is required for each state transition. Conversely, a NFSM model does have to obey these restrictions.

The control mesh node 108 includes a network interface 306b configured to establish a communication session with a computing device for sending and receiving data over a network to the computing device. Accordingly, the network interface 306b includes identical or nearly identical functionality as network interface 306a in FIG. 3A, but with respect to devices and/or components of the control mesh node 108 instead of devices and/or components of the mesh node 104.

The control mesh node 108 includes an input/output device 305b configured to receive user input from and provide information to a user. In this regard, the input/output device 305b is structured to exchange data, communications, instructions, etc. with an input/output component of the control mesh node 108. The input/output device 305b includes identical or nearly identical functionality as input/output device 305a in FIG. 2A, but with respect to devices and/or components of the control mesh node 108 instead of devices and/or components of the mesh node 104.

The control mesh node 108 includes a device identification component 307b (shown in FIG. 3B as device ID component 307b) configured to generate and/or manage a device identifier associated with the control mesh node 108. The device ID component 307b includes identical or nearly identical functionality as device ID component 307a in FIG. 3A, but with respect to devices and/or components of the control mesh node 108 instead of devices and/or components of the mesh node 104.

The control mesh node 108 includes a bus (not shown), such as an address/data bus or other communication mechanism for communicating information, which interconnects the devices and/or components of the control mesh node 108, such as processing device 302b, network interface 306b, input/output device 305b, and/or device ID component 307b.

In some embodiments, some or all the devices and/or components of control mesh node 108 may be implemented with the processing device 302b. For example, the control mesh node 108 may be implemented as a software application stored within the memory 304b and executed by the processing device 302b. Accordingly, such embodiment can be implemented with minimal or no additional hardware costs. In some embodiments, any of these above-recited devices and/or components rely on dedicated hardware specifically configured for performing operations of the devices and/or components.

Figure 3C:
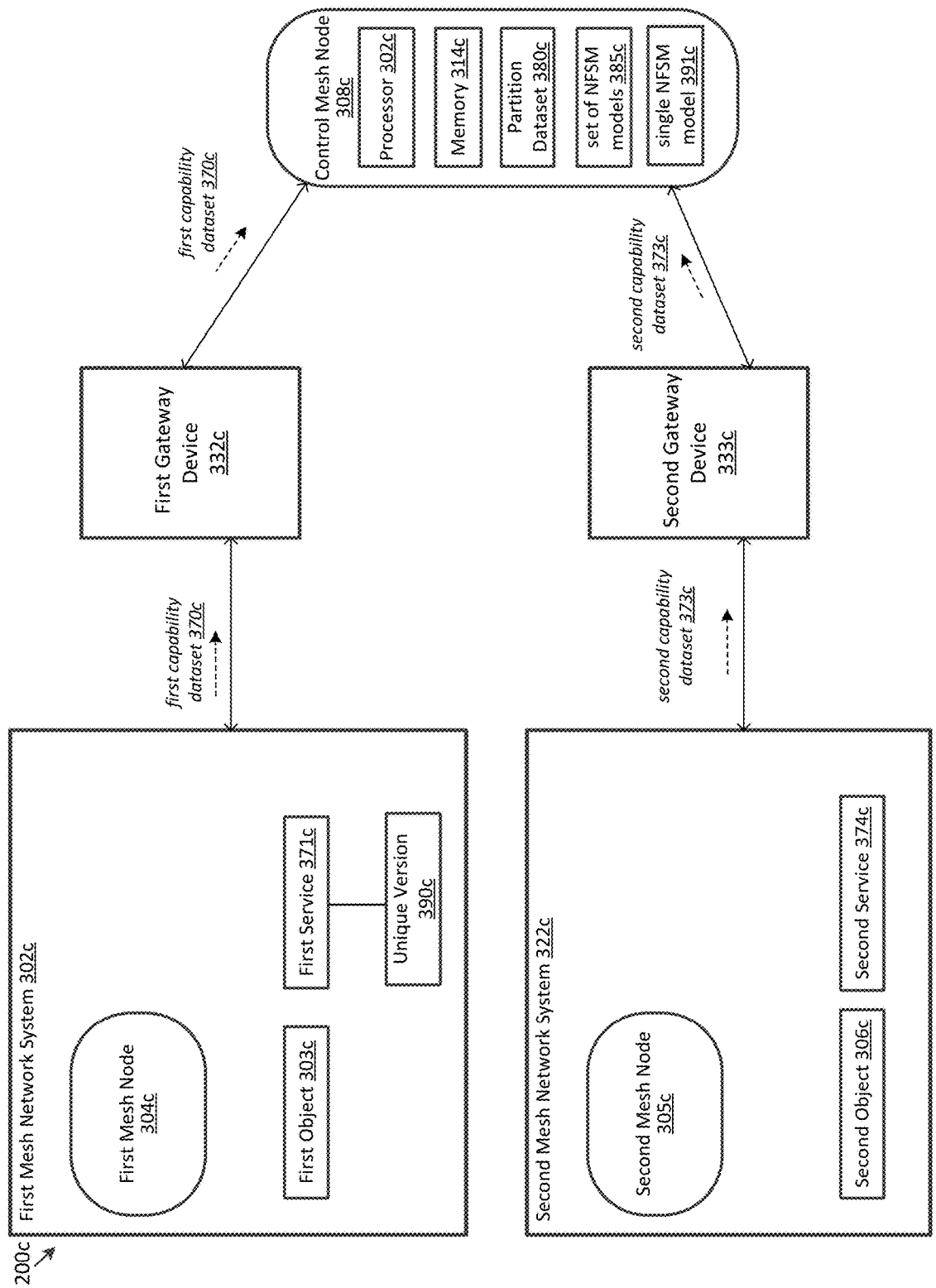
FIG. 3C is a block diagram depicting an example environment of a control mesh node, according to some embodiments.

FIG. 3C is a block diagram depicting an example environment of a control mesh node, according to some embodiments. The control mesh node 308c includes a memory 314c; and a processing device 302c that is operatively coupled to the memory 314c. The processing device 302c to obtain, from a first gateway device 332c coupled to a first mesh network system 302c, a first capability dataset 370c indicating capabilities of a first mesh node 304c of the first mesh network system 302c to provide a first service 371c for a first object 303c coupled to the first mesh node 304c. The processing device 302c to obtain, from a second gateway device 333c coupled to a second mesh network system 322c, a second capability dataset 373c indicating capabilities of a second mesh node 305c of the second mesh network system 322c to provide a second service 374c to a second object 306c coupled to the second mesh node 305c. The processing device 302c to generate, based on the first capability dataset 370c and the second capability dataset 373, a partition dataset 380c indicating that the first service 371c is to be provided to the second object 306c by using the first mesh node 304c and the second mesh node 305c. The processing device 302c to generate, based on the first capability dataset 370c and the second capability dataset 373c, a set of non-deterministic finite-state machine (NFSM) models 385c for the first object 303c and the second object 306c. Each NFSM model of the set of NFSM models 385c is configured to provide a unique version 390c of the first service for the first object 303c or the second object 306c. The processing device 302c to provide, to the first gateway device 332c and the second gateway device 333c, the set of NFSM models 385c and the partition dataset 380c to cause the first gateway device 332c and the second gateway device 333c to use a single NFSM model 391c of the set of NFSM models 385c to provide the unique version 390c of the first service to the second object 306c.

FIG. 4 is a flow diagram depicting a method of partitioning and distributing models that provide one or more services to a mesh node of a mesh network system using multiple mesh nodes of multiple mesh network systems, according to some embodiments. Method 400 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 400 may be performed by a control mesh node, such as control mesh node 108 in FIGS. 1 and 2. In some embodiments, method 400 may be performed by one or more mesh nodes, such as mesh nodes 104 in FIG. 1. In some embodiments, method 400 may be performed by a mesh network system, such as mesh network system 102 in FIG. 1 or multiple mesh network systems, such as mesh network system 202 and mesh network system 222 in FIG. 2.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of obtaining, from a first gateway device coupled to a first mesh network system, a first capability dataset indicating capabilities of a first mesh node of the first mesh network system to provide a first service for a first object coupled to the first mesh node. The method 400 includes the block 404 of obtaining, from a second gateway device coupled to a second mesh network system, a second capability dataset indicating capabilities of a second mesh node of the second mesh network system to provide a second service to a second object coupled to the second mesh node. The method 400 includes the block 406 of generating, by a processing device based on the first capability dataset and the second capability dataset, a set of non-deterministic finite-state machine (NFSM) models for the first object and the second object, each NFSM model of the set of NFSM models to provide the first service for the first object or the second object. The method 400 includes the block 408 of providing, to the first gateway device and the second gateway device, the set of NFSM models and the partition dataset to cause the first gateway device and the second gateway device to use a single NFSM model of the set of NFSM models to provide the first service to the second object.

Figure 5:
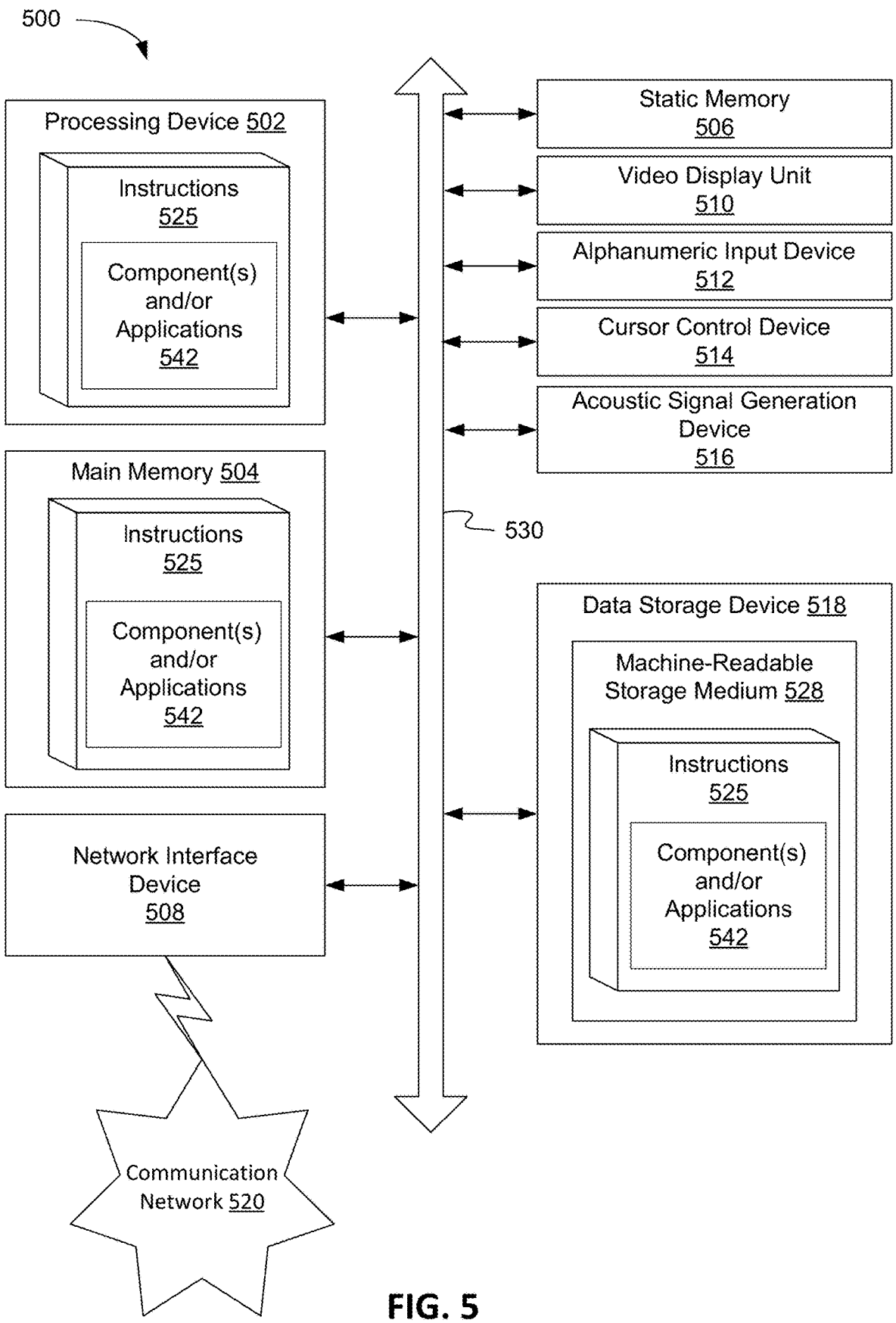
FIG. 5 is a block diagram of an example computing device that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general-purpose processor, a PLD, etc.) 502, a main memory 504 (e.g., synchronous dynamic random-access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components, agents, and/or applications 542 (e.g., SMM agent 105 in FIG. 1, ASM agent 109 in FIG. 1) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "obtaining" "receiving," "generating," "providing," "sending," "selecting," "discovering," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method, comprising:

obtaining, from a first gateway device coupled to a first mesh network system, a first capability dataset indicating capabilities of a first mesh node of the first mesh network system to provide a first service for a first object coupled to the first mesh node;

obtaining, from a second gateway device coupled to a second mesh network system, a second capability dataset indicating capabilities of a second mesh node of the second mesh network system to provide a second service to a second object coupled to the second mesh node;

generating, by a processing device based on the first capability dataset and the second capability dataset, a set of non-deterministic finite-state machine (NFSM) models for the first object and the second object, each NFSM model of the set of NFSM models to provide the first service for the first object or the second object; and providing, to the first gateway device and the second gateway device, the set of NFSM models and a partition dataset to cause the first gateway device and the second gateway device to use a single NFSM model of the set of NFSM models to provide the first service to the second object.

2. The method of claim 1, further comprising:

discovering the first gateway device and the second gateway device;

obtaining, from the first gateway device, a first topography dataset identifying a first group of mesh nodes of the first mesh network system;

obtaining, from the second gateway device, a second topography dataset identifying a second group of mesh nodes of the second mesh network system;

querying, using the first topography dataset, the first gateway device for the first topography dataset; and querying, using the second topography dataset, the second gateway device for the second topography dataset.

3. The method of claim 1, further comprising:

generating, based on the first capability dataset and the second capability dataset, the partition dataset indicating that the first service is to be provided to the second object by using the first mesh node and the second mesh node, wherein providing the set of NFSM models and the partition dataset to the first gateway device further causes the first gateway device to determine a state of the first object based on the single NFSM model and sensor data associated with the first mesh node, and provide a model output indicative of the state of the first object to the second gateway device.

4. The method of claim 3, wherein the first gateway device provides the model output to the second gateway device via a dedicated channel between the first gateway device and the second gateway device.

5. The method of claim 3, wherein providing the set of NFSM models and the partition dataset to the second gateway device further causes the second gateway device to enter a listen mode to listen for the model output from the first gateway device.

6. The method of claim 3, wherein providing the set of NFSM models and the partition dataset to the second gateway device further causes the second gateway device to generate configuration data for the second object based on the single NFSM model and the model output.

7. The method of claim 6, wherein providing the set of NFSM models and the partition dataset to the second gateway device further causes the second gateway device to provide the configuration data to the second mesh node.

8. The method of claim 1, wherein generating, based on the first capability dataset and the second capability dataset, the partition dataset further comprises:
determining a first capability of the first mesh node to provide a first portion of the first service and a second capability of the second mesh node to provide a second portion of the first service.

9. The method of claim 1, further comprising:
detecting a failure associated with the second gateway device; and
instructing, responsive to detecting the failure, the first gateway device to provide a model output from a selected NFSM model of the set of NFSM models to a third gateway device coupled to a third mesh network system, wherein the model output is indicative of a state of the first object coupled to the first mesh node.

10. The method of claim 9, wherein instructing, responsive to detecting the failure, the first gateway device to provide the model output from the selected NFSM model of the set of NFSM models to the third gateway device comprises:
obtaining, from the third gateway device, a third capability dataset indicating capabilities of a third mesh node of the third mesh network system to provide a third service for a third object coupled to the third mesh node;
generating, based on the first capability dataset and the third capability dataset, a different partition dataset indicating that the first service is to be provided to the third object by using the first mesh node and the third mesh node;
generating, based on the first capability dataset and the third capability dataset, a different set of NFSM models for the first object and the third object, each NFSM model of the different set of NFSM models is configured to provide the first service for the first object or the third object; and
providing, to the first gateway device and the third gateway device, the different set of NFSM models and the different partition dataset to cause the first gateway device and the third gateway device to use a different NFSM model of the different set of NFSM models to provide the first service to the third object.

11. The method of claim 1, wherein providing, to the first gateway device and the second gateway device, the set of NFSM models and the partition dataset further causes:
the first gateway device to receive a first copy of the set of NFSM models and execute a first NFSM model of the first copy of the set of NFSM models on a first processing device of the first gateway device, and
the second gateway device to receive a second copy of the set of NFSM models and execute a second NFSM model of the second copy of the set of NFSM models on a second processing device of the second gateway device, wherein the first NFSM model corresponds to the second NFSM model.

12. A control mesh node, comprising:
a memory; and
a processing device that is operatively coupled to the memory, to:
obtain, from a first gateway device coupled to a first mesh network system, a first capability dataset indicating capabilities of a first mesh node of the first mesh network system to provide a first service for a first object coupled to the first mesh node;
obtain, from a second gateway device coupled to a second mesh network system, a second capability dataset indicating capabilities of a second mesh node of the second mesh network system to provide a second service to a second object coupled to the second mesh node;
generate, based on the first capability dataset and the second capability dataset, a set of non-deterministic finite-state machine (NFSM) models for the first object and the second object, each NFSM model of the set of NFSM models is configured to provide the first service for the first object or the second object; and
provide, to the first gateway device and the second gateway device, the set of NFSM models and a partition dataset to cause the first gateway device and the second gateway device to use a single NFSM model of the set of NFSM models to provide the first service to the second object.

13. The control mesh node of claim 12, wherein the processing device is further to:
discover the first gateway device and the second gateway device;
obtain, from the first gateway device, a first topography dataset identifying a first group of mesh nodes of the first mesh network system;
obtain, from the second gateway device, a second topography dataset identifying a second group of mesh nodes of the second mesh network system;
query, using the first topography dataset, the first gateway device for the first topography dataset; and
query, using the second topography dataset, the second gateway device for the second topography dataset.

14. The control mesh node of claim 12, wherein the processing device is further to:
generate, based on the first capability dataset and the second capability dataset, the partition dataset indicating that the first service is to be provided to the second object by using the first mesh node and the second mesh node;
wherein to provide the set of NFSM models and the partition dataset to the first gateway device further causes the first gateway device to:

determine a state of the first object based on the single NFSM model and sensor data associated with the first mesh node; and provide a model output indicative of the state of the first object to the second gateway device.

15. The control mesh node of claim 14, wherein the first gateway device provides the model output to the second gateway device via a dedicated channel between the first gateway device and the second gateway device.

16. The control mesh node of claim 14, wherein to provide the set of NFSM models and the partition dataset to the second gateway device further causes the second gateway device to:

enter a listen mode to listen for the model output from the first gateway device;

generate configuration data for the second object based on the single NFSM model and the model output; and provide the configuration data to the second mesh node.

17. The control mesh node of claim 12, wherein to generate, based on the first capability dataset and the second capability dataset, the partition dataset, the processing device is further to:

determine a first capability of the first mesh node to provide a first portion of the first service and a second capability of the second mesh node to provide a second portion of the first service.

18. The control mesh node of claim 12, wherein the processing device is further to:

detect a failure associated with the second gateway device; and instruct, responsive to detecting the failure, the first gateway device to provide a model output from a selected NFSM model of the set of NFSM models to a third gateway device coupled to a third mesh network system, wherein the model output is indicative of a state of the first object coupled to the first mesh node.

19. The control mesh node of claim 18, wherein to instruct, responsive to detecting the failure, the first gateway device to provide the model output from the selected NFSM model of the set of NFSM models to the third gateway device, the processing device is further to:

obtain, from the third gateway device, a third capability dataset indicating capabilities of a third mesh node of the third mesh network system to provide a third service for a third object coupled to the third mesh node;

generate, based on the first capability dataset and the third capability dataset, a different partition dataset indicating that the first service is to be provided to the third object by using the first mesh node and the third mesh node;

generate, based on the first capability dataset and the third capability dataset, a different set of NFSM models for the first object and the third object, each NFSM model of the different set of NFSM models is configured to provide the first service for the first object or the third object; and provide, to the first gateway device and the third gateway device, the different set of NFSM models and the different partition dataset to cause the first gateway device and the third gateway device to use a different NFSM model of the different set of NFSM models to provide the first service to the third object.

20. A non-transitory computer-readable medium storing instructions that, when execute by a processing device, cause the processing device to:

obtain, from a first gateway device coupled to a first mesh network system, a first capability dataset indicating capabilities of a first mesh node of the first mesh network system to provide a first service for a first object coupled to the first mesh node;

obtain, from a second gateway device coupled to a second mesh network system, a second capability dataset indicating capabilities of a second mesh node of the second mesh network system to provide a second service to a second object coupled to the second mesh node;

generate, by the processing device based on the first capability dataset and the second capability dataset, a set of non-deterministic finite-state machine (NFSM) models for the first object and the second object, each NFSM model of the set of NFSM models is configured to provide the first service for the first object or the second object; and provide, to the first gateway device and the second gateway device, the set of NFSM models and a partition dataset to cause the first gateway device and the second gateway device to use a single NFSM model of the set of NFSM models to provide the first service to the second object.

* * * * *